United States Patent Office 3,252,136
Patented May 17, 1966

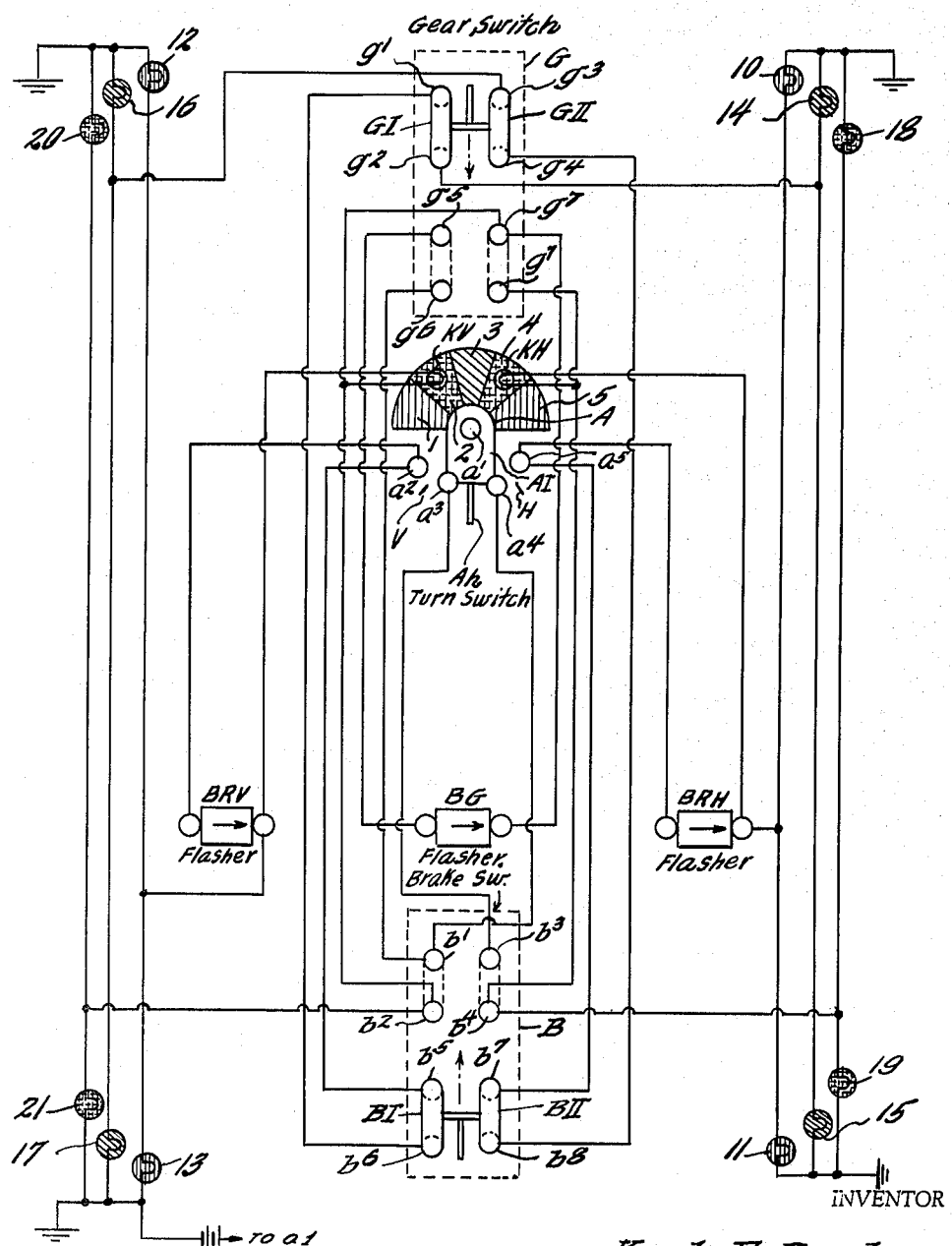

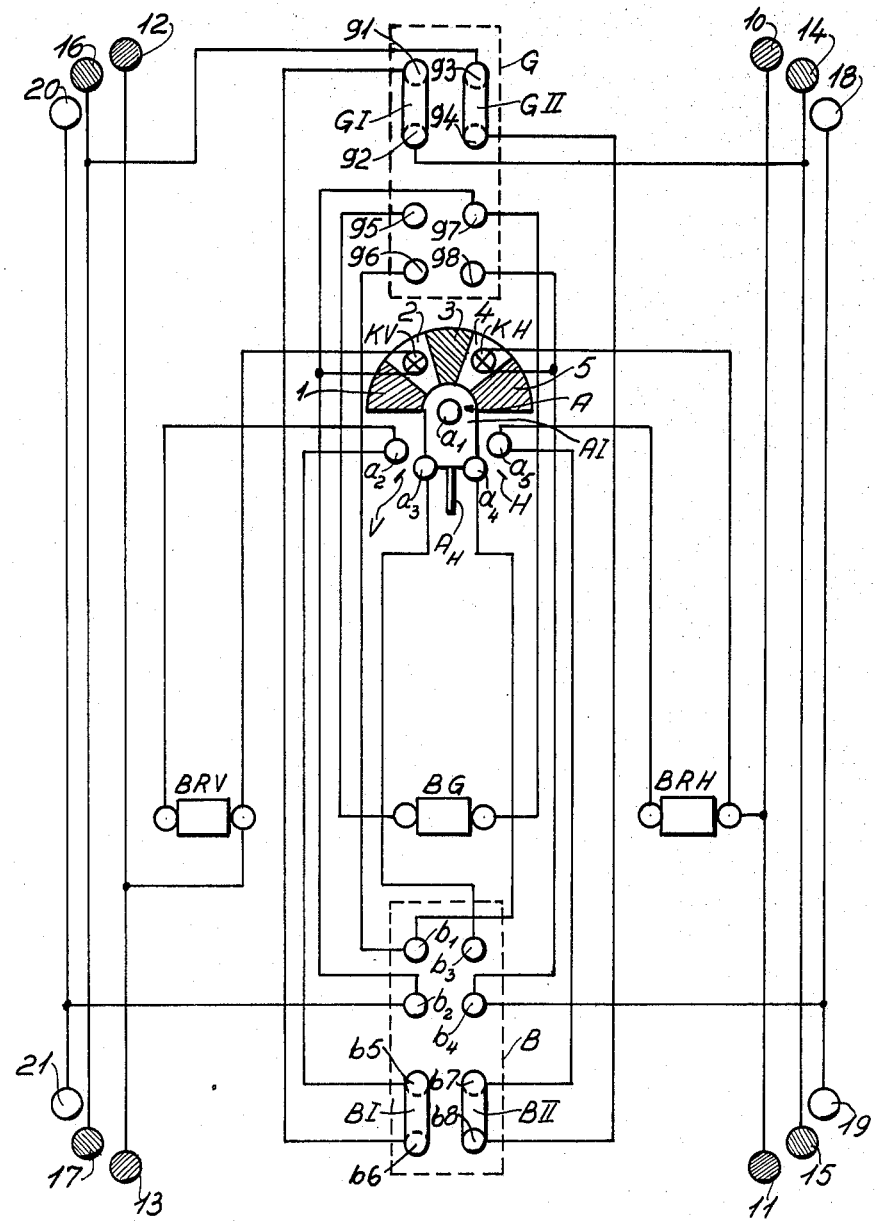

3,252,136
SIGNALLING SYSTEM FOR AUTOMOBILES
Karl Emil Bartens, Vanlose-Copenhagen, Denmark
(Boyesgade 5A, Copenhagen, Denmark)
Filed Dec. 26, 1961, Ser. No. 161,827
Claims priority, application Denmark, Jan. 3, 1961, 15/61
1 Claim. (Cl. 340—74)

This invention relates to a signalling system for an automobile, of the general type having signal lamps arranged to display signals representative of control operations performed by the driver.

The systems of this type now in general use ordinarily comprise direction indicator lamps arranged to display flash signals, e.g. red, at the side of the automobile corresponding to an intended direction of turn, said flash signals being initiated by the setting of a direction indicator switch operable by the driver, and also stop or brake lamps arranged to display continuous signals, e.g. yellow, responsive to application of the brakes.

These known systems suffer from several drawbacks. Thus, when a turn is to be made, e.g. to the right, a signal is of course displayed at the right hand side of the automobile, and this signal can also be seen if the automobile is observed directly from the rear or directly from the front. If, however, the automobile is observed from the side facing outwards in the turn, i.e. from the left hand side of the automobile, no signal is displayed at this side, and consequently traffic present at that side of the automobile has no means of knowing which maneuver the automobile is about to make. The same calamity occurs when the automobile is to make a left turn, because no signal will then be displayed at the right hand side of the automobile. Also in the case of braking, the known signalling systems are not very satisfactory since only the traffic driving behind the automobile is capable of perceiving that the automobile in front of them is applying its brakes. The part of the traffic present in front of or at the sides of the automobile are not warned about this maneuver, and therefore has to wait until it becomes apparent from the rapidly decreasing speed of the automobile that it is applying its brakes. Moreover, there are maneuvers that are not at all indicated by the known systems. Thus, if an automobile equipped with such a system changes its gears to back gear position, the driver has no possibility of indicating this.

It is an object of the present invention to devise a signalling system for automobiles capable of displaying signals representative of a wider range of maneuvers than the systems hitherto known.

It is another object of the invention to devise a system of the general type referred to capable of displaying representative signals visible and intelligible within a wider range of angles around the automobile than has hitherto been possible.

It is a further object of the invention to make use of types of signals that in themselves are internationally recognized as having a definite meaning for indicating the maneuvers and intended maneuvers of an automobile in a more exhaustive manner than has been the practice up to now, examples of such signals being red light for danger, green light for clear, yellow continuous light for attention and yellow flash light for warning.

It is a still further object of the invention to combine a signalling system of the type referred to with a control signal system visible by the driver and arranged to display light signals clearly recognizable as representative of those displayed by the signal lamps.

With these and other objects in view, which will be apparent as the description proceeds, the invention resides in the novel arrangement and combinations set forth in the appended claim.

In the drawing, A represents a direction indicator switch having contacts $a1$, $a2$, $a3$, $a4$, $a5$. The direction indicator switch is provided with a handle or knob diagrammatically indicated at AH which handle or knob is capable of being set in three different positions, viz. a neutral position as indicated in the drawing, a left turn position indicated at V and a right turn position indicated at H. In the neutral position, a contact member AI establishes a connection between the live contact $a1$ of the switch and the two contacts $a3$ and $a4$. In the position V, connection is established between $a1$ and $a2$, $a3$, and in the position H, connection is established between $a1$ and $a4$, $a5$. The contact member AI carries a translucent segment having five sectors 1, 2, 3, 4 and 5. The sector 1 is red, the sector 2 yellow, the sector 3 green, the sector 4 yellow and the sector 5 red. Under the yellow sector 2 and the other yellow sector 4 in the neutral position of the direction indicator switch a left control lamp KV and a right control lamp KH respectively are provided.

The system also comprises a brake switch B having eight contacts $b1$, $b2$, $b3$, $b4$, $b5$, $b6$, $b7$ and $b8$, and two mechanically ganged but electrically separated contact members BI and BII. In the neutral position, these contact members connect the contacts $b5$, $b6$ and $b7$, $b8$ respectively. Upon application of the brakes of the automobile, the contact members BI and BII are automatically moved so as to close the contacts $b1$, $b2$ and $b3$, $b4$, respectively. When the brakes are released, the contact members are moved back to the position shown in the drawing.

The signalling system also comprises a gear change switch G having eight contacts $g1$, $g2$, $g3$, $g4$, $g5$, $g6$, $g7$ and $g8$, and two contact members GI and GII which are mechanically ganged but electrically separated from one another, and which in the neutral gear position and the forward gear positions close the contacts $g1$, $g2$ and $g3$, $g4$ respectively. In the back gear position, however, the contact members close the contacts $g5$, $g6$ and $g7$, $g8$, respectively.

The signalling system also comprises four groups of signal lamps intended for mounting at the four corners of the automobile, each group comprising three signal lamps, viz. a red, a green and a yellow lamp. In order to facilitate the understanding of the drawing, red is marked by hatching lines extending upwards to the right, while green is marked by hatching lines extending downwards to the right and yellow is not marked at all. In the drawing 10, 14 and 18 represent the red, green and yellow signal lamps respectively at the right hand front corner, 11, 15 and 19 the red, green and yellow signal lamps respectively at the right hand rear corner, 12, 16 and 20 the red, green and yellow signal lamps respectively at the left hand front corner and 13, 17 and 21 the red, green and yellow signal lamps respectively at the left hand rear corner.

The right hand red signal lamps 10 and 11 are connected to a flash relay BRH, and the left hand red signal lamps 12 and 13 are connected to a flash relay BRV. Another flash relay BG is provided in the circuit of the yellow signal lamps 18, 19, 20 and 21.

The various components of the signalling system are connected with each other through electrical conductors represented by full lines in the drawing.

The operation of the system illustrated is as follows.

When the signalling system is in its neutral position, the components assume the positions illustrated in the drawing, i.e. the indicator switch A is in its middle position, the brake is not applied and the gear is in neutral or a forward position. In this position all signal lamps and control lamps are non-energized, but if the brakes are applied, and the contact members BI and BII are consequently moved to the contact group $b1$–$b4$, the following circuits are closed:

$a1$, $a3$, $b3$, $b4$ and 18, 19, i.e. the right hand yellow signal lamps display continuous light, and $a1$, $a4$, $b1$, $b2$ and 20, 21 i.e. also the left hand yellow lamps display continuous light, and From $b2$ and $b4$ current flows to the left hand and the right hand control lamps KV and KH, which consequently emit continuous light, and since yellow translucent sectors are at the same time present above the control lamps, yellow control light is displayed.

Thus, during braking all the yellow signal lamps display continuous light, and at the same time the control disc, too, displays yellow continuous light sectors.

If the brake is released, the signalling system is restored to its initial position.

If, however, the gears are changed to back gear position, the contact members GI and GII are moved from the contact group $g1$–$g4$, to $g5$–$g8$ and the following circuit is closed:

$a1$, $a4$, $b1$, $g6$, $g5$ through the flash relay BG to $g7$ and $g8$ and from there the pulsating current produced by the flash relay flows via $b2$ and $b4$ respectively whereby all the yellow signal lamps are caused to display flash light while at the same time the control disc 2 displays yellow flash sectors, because the current is branched via KV and KH.

Thus, when the gears are in back gear position, yellow flash light is displayed around the whole of the automobile and at the same time two yellow flash sectors are displayed on the control disc.

If the brakes are applied with the gears in back gear position, the following circuits are closed:

$a1$, $a3$, $b3$, $b4$ and 18, 19. From $b4$ the current flows to the right hand control lamp KH.

Moreover, $a1$, $a4$, $b1$, $b2$ and 20, 21 are closed, and from $b2$ the current flows to the left hand control lamp KV.

Thus, when the brakes are applied with the gears in back gear position, all four yellow signal lamps display continuous light and the same applies to both of the control sectors.

When a right turn is to be made, the driver sets the direction indicator switch A in the position H, and provided the brakes are idle and the gears are in neutral gear position or a forward gear position, the following circuits are established:

$a1$, $a5$ and through the relay BRH to the right hand red signal lamps 10 and 11 which display flash light. From the relay current flows to the right hand control lamp KH, which is therefore caused to flash, and since the sector 5 is at the same time present above the said control lamp, the resulting flash light will be red. Moreover, the light from the right hand control lamp will be thrown through the green sector 3 which is now present above the left hand control lamp, and since a mask having two holes corresponding to the two control lamps is provided above the colored translucent disc, the hole present above the left hand control lamp will display green light.

When the direction indicator switch is in the position H, the following circuit will at the same time be closed:

$a1$, $a5$, $b7$, $b8$, $g4$, $g3$ and 16, 17, i.e. the left hand green signal lamps will display continuous light.

Conversely, if the direction indicator switch is set in the position V, the left hand red signal lamps 12 and 13 will display flash light while the right hand green signal lamps 14 and 15 will display continuous light.

Moreover, when the direction indicator switch is in the position V, the left hand control lamp KV will emit flash light and since a red sector 1 is present above the control lamp, red light will be displayed at that side. As far as the right hand control lamp KH is concerned, the green sector 3 will be present thereabove, so that a green signal is displayed.

If the brakes are applied while the direction indicator switch A is in the position H, the contact members BI, BII are moved so as to close the contacts $b1$, $b2$ and $b3$, $b4$ respectively, and the following circuits are closed:

$a1$, $a4$, $b1$, $b2$ and from there the left hand yellow signal lamps 20, 21 are lighted to display continuous light. From $b2$ current flows to the left hand control lamp KV. At the same time the connection $a1$, $a5$, BRH, 10 and 11 is maintained while the left hand green signal lamps are extinguished.

Thus, braking during a right turn is indicated by lighting of the yellow signal lamps at the left hand side to display continuous light instead of the green lamps, while the right hand red signal lamps display flash light.

If the brakes are released, the yellow light is extinguished and the left hand green signal lamps are again lighted to display continuous light.

In the case of a left hand turn in combination with application of the brakes, the opposite signal constellation will appear, the left hand red signal lamps continuing to flash, and the right hand green light being replaced by yellow continuous light.

If the gears are set in back gear position, while the direction indicator switch is in position H and the brakes are idle, the following circuits are closed:

$a1$, $a5$, BRH, 10 and 11, i.e. the right hand red signal lamps flash, and moreover via $a1$, $a4$, $b1$, $g6$, $g5$, BG, $g7$ and $g8$ and from there to $b2$ and $b4$ respectively, so that all the yellow signal lamps are lighted with flash light.

Thus, backward driving with right turn is indicated by red flash to the right and yellow flash the whole way round the automobile. Conversely, backward driving with left turn is indicated by red flash to the left and yellow flash the whole way round the automobile.

Of these signals, the red flash signal is not considered essential in these circumstances, and therefore might be omitted by a suitable change of the diagram. While I consider the display of the red flash light a distinct advantage, it will of course be for the competent authorities to decide whether this should be authorized or even compulsory.

If a backward turn to the right is interrupted by application of the brakes, the contacts $b1$, $b2$ and $b3$, $b4$ respectively are closed, and since also $g5$, $g6$ and $g7$, $g8$ respectively are closed, and the direction indicator switch is in the position H, the following circuits are closed:

$a1$, $a5$, BRH 10 and 11, i.e. the right hand red signal lamps flash.

$a1$, $a4$, $b1$, $b2$, 20 and 21, i.e. the left hand yellow signal lamps are lighted to display constant light, while at the same time a control signal is displayed, and moreover, from $b2$ to $g7$, $g8$, $b4$, 18 and 19, i.e. also the right hand yellow signal lamps are lighted to display continuous light. Thus, backward driving with turn to the right interrupted by braking is indicated by red flash to the right and continuous yellow light all the way round the automobile. Conversely, a backward left turn combined with application of the brakes is indicated by red flash to the left and yellow continuous light all the way round the automobile.

Of these signals, the red flash light is not considered essential under the circumstances herein question and could be omitted by a suitable change of the diagram.

It will be understood that the signal combinations displayed are independent of the succession in which the various operations are performed. Thus, the same signal combinations will be displayed whether braking is initiated before change of gears or vice versa, and whether change of gears is performed before setting of the direction indicator switch or vice versa.

The expressions "red flash to the right," "red flash to the left" etc. have been used only for convenience. In practice, each lamp group may advantageously consist of individual red, green and yellow lamps having a common neutral translucent cover or screen extending around the respective corner of the automobile so that the signal displayed at the corner will be visible within an angle equal to or approximating 270°. Hereby the additional advantage is obtained, that the signals displayed are capable of being correctly interpreted even by a totally colorblind person, because not only predetermined color combinations are displayed, but also predetermined combinations of flash and continuous light, which combinations are characteristic of the maneuvers to be made.

A further advantage obtained by employing individual red, green and yellow lamps within a common neutral translucent screen is that there is no danger of reflected sunlight being misinterpreted as signals.

As will be seen in the drawing, only one conductor is connected to each of the signal lamps, the other connection to these lamps being constituted by a permanent connection to the frame of the automobile. On the other hand, two conductors are connected to each of the control lamps, because these are not permanently grounded. The conductors leading to the control lamps are connected to opposite ends of the incandescent filament of the lamp in question, so that one serves as ground connection while the other is live and vice versa.

Note that one control lamp will suffice because this may serve as a source of light common to two holes of a mask in front of the colored disc, and light will then be admitted through the two holes in colors corresponding to the colors of the sectors present under the holes.

I claim:

A signalling system for an automobile comprising four groups of signal lamps mounted respectively at the four corners of the automobile, each group comprising a red, a green, and a yellow lamp, a direction indicator switch having a neutral position, a position for right turn and a position for left turn, flash relay means connected through said direction indicator switch operable upon right and left turn positioning of said direction indicator switch to intermittently energize said red lamps in the direction of the turn and circuit connections by said direction indicating switch causing continuous energization of said green lamps at the opposite side of said automobile, a brake switch operable by a brake means, said switch connected to continuously energize said yellow lamps upon application of said brake means, said yellow lamps and said green lamps having connections to said brake switch whereby the operation of said brake switch energizes the yellow and de-energizes the green lamps, and a gear switch and a second flash relay means connected in circuit with said yellow lamps to cause intermittent energization in a reverse gear position, said second flash relay means being connected so as to be disabled upon application of said brake means.

References Cited by the Examiner

UNITED STATES PATENTS

| | | | |
|---|---|---|---|
| 1,465,210 | 8/1923 | Combs | 340—100 X |
| 1,749,168 | 3/1930 | Swartout | 340—67 |
| 1,801,236 | 4/1931 | Brown | 340—74 X |
| 2,125,668 | 8/1938 | Chase | 340—55 |
| 2,188,451 | 1/1940 | Bartens | 340—55 |
| 2,602,849 | 7/1952 | Lawson et al. | 340—81 X |
| 2,810,899 | 10/1957 | Foster | 340—81 X |
| 2,897,479 | 7/1959 | Keegin | 340—74 |
| 3,037,188 | 5/1962 | Weigl | 340—70 |
| 3,110,012 | 11/1963 | Manning | 340—74 |
| 3,128,447 | 4/1964 | Eaves | 340—67 |

NEIL C. READ, *Primary Examiner.*

ROBERT H. ROSE, *Examiner.*

W. C. GLEICHMAN, I. J. LEVIN,
*Assistant Examiners.*